(12) United States Patent
Dobashi

(10) Patent No.: US 7,872,534 B2
(45) Date of Patent: Jan. 18, 2011

(54) IMAGE SIGNAL AMPLIFYING CIRCUIT AND AMPLIFYING SEMICONDUCTOR INTEGRATED CIRCUIT

(75) Inventor: Nagayoshi Dobashi, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 148 days.

(21) Appl. No.: 12/260,252

(22) Filed: Oct. 29, 2008

(65) Prior Publication Data

US 2009/0115532 A1    May 7, 2009

(30) Foreign Application Priority Data

Nov. 7, 2007    (JP) ............................. 2007-289235

(51) Int. Cl.
*H03F 3/191* (2006.01)
(52) U.S. Cl. ....................................... 330/306; 330/307
(58) Field of Classification Search ................. 330/306, 330/307, 310
See application file for complete search history.

(56) References Cited

U.S. PATENT DOCUMENTS 4,110,692 A * 8/1978 Pradal ......................... 330/109
4,928,311 A * 5/1990 Trompler ..................... 381/72

FOREIGN PATENT DOCUMENTS

JP    2004-274434 A    9/2004
JP    2005-184056 A    7/2005

* cited by examiner

*Primary Examiner*—Khanh V Nguyen
(74) *Attorney, Agent, or Firm*—Holtz, Holtz, Goodman & Chick, PC

(57) ABSTRACT

An image signal amplifying circuit comprises: an amplifier circuit for amplifying an image signal; an output capacitor and a resistance, both being serially connected between an output node of the amplifier circuit and an output terminal; and a second-order high pass filter having a value of Q larger than one, the second-order high pass filter being provided at a preceding stage of the amplifier circuit, wherein distortion to correct a sag arising in a high pass filter on an output side, the high pass filter including the output capacitor and the resistance, is caused in the input image signal by a characteristic of the second-order high pass filter.

4 Claims, 6 Drawing Sheets

IMAGE SIGNAL AMPLIFYING CIRCUIT AND AMPLIFYING SEMICONDUCTOR INTEGRATED CIRCUIT

BACKGROUND OF THE INVENTION

1. Field of the Invention

The present invention relates to an analog signal amplifying circuit, and more particularly to a technique effective for a use for lowering the capacity of an output capacitor of an image signal amplifying circuit having prescribed output impedance on the side of outputting a signal and prescribed input impedance on the side of receiving a signal.

2. Related Art

For example, a circuit shown in FIG. 4A is known as an amplifier circuit for amplifying an image signal read from a digital versatile disc (DVD) or the like and converted by digital to analog (DA) conversion, and for outputting the amplified image signal to a television apparatus or the like through a cable. This kind of the image signal amplifying circuit uses an output capacitor C1 for transmitting only the alternating current component of the image signal, and for example, the Japan Electronics and Information Technology Industries Association (JEITA) prescribes each of the resistance values of both of a resistance R1 connected to the output capacitor C1 in series with each other and an input resistance Ri of the side of the input equipment for receiving the output image signal to 75Ω. Consequently, the load viewed from a buffer on the side of the output equipment is 150Ω in total.

Now, because an image signal is a signal having a very wide frequency range such as the one from 30 Hz to 6 MHz, if the amplifier circuit configured as shown in FIG. 4A is used for amplifying the image signal, then the output capacitor C1 and the resistances R1 and Ri constitute a high pass filter, and it is required to set the cut-off frequency thereof to about 1 Hz in order to output an image signal of 30 Hz without any distortion. In this case, because the output capacitor C1 is required to have a large capacitance value such as 1000 μF, it is obliged to use an electrolytic capacitor as the output capacitor C1, and the use of the electrolytic capacitor has been a cause of preventing the cost reduction and miniaturization of the output capacitor C1.

Accordingly, a technique for enabling the miniaturization of the output capacitor C1 while preventing the occurrence of a sag, which is the hanging of the waveform of an output signal, by connecting a feedback capacitor C2 and a resistance R2 between the output terminal and the negative phase input terminal of an operational amplifier AMP1 as shown in FIG. 4B was developed. The circuit shown in FIG. 4B has an advantage of being capable of reducing the capacitance value of the output capacitor C1 to about 1/10 of that of the circuit shown in FIG. 4A. The circuits shown in FIGS. 4A and 4B are disclosed in, for example, FIGS. 3C and 3B, respectively, of Japanese Patent Application Laid-Open Publication No. 2004-274434 (hereinafter referred to as Patent Document 1) as related art.

The circuit shown in FIG. 4B has an advantage of being capable of setting the capacitance value of the output capacitor C1 to be about 1/10 of that of the circuit of FIG. 4A. However, the capacitance of the output capacitor C1 is needed to be about 100 μF even in this case, and the capacitance of the feedback capacitor C2 is needed to be about 22 μF. Consequently, it is needed to use electrolytic capacitors, which are relatively expensive, as the capacitors C1 and C2, and a problem of the difficulty of being unable to attain sufficient cost reduction remains.

Moreover, the circuit of FIG. 4B has a disadvantage that the input dynamic range thereof becomes narrow when the circuit is adapted to have a low power source voltage. The Patent Document 1 discloses an invention enabling the circuit to have a wide input dynamic range by using an inverting amplifier circuit. However, even in this invention, the output capacitor C1 is required to have the capacitance of about 100 μF, and the feedback capacitor C2 is required to have the capacitance of about 22 μF. Although, the invention enables the miniaturization of the capacitors C1 and C2 in comparison with the circuit of FIG. 4A, the invention cannot attain sufficient cost reduction similarly to the circuit of FIG. 4B.

Moreover, since the invention of the Patent Document 1 uses the inverting amplifier circuit, the invention has a disadvantage of the inversions of image signals. In order to avoid the disadvantage, the invention is required to provide another inverting amplifier circuit at the preceding stage of the inverting amplifier circuit as disclosed in FIG. 5 of the Patent Document 1, and then the invention has a problem of causing the further enlargement of the circuit size thereof.

On the other hand, as an invention enabling further miniaturization of the capacitor while preventing the occurrence of any sag by using a non-inverting amplifier circuit, for example, there is an invention disclosed in Japanese Patent Application Laid-Open Publication No. 2005-184056 (hereinafter referred to as Patent Document 2). The invention is provided with a low pass filter 6, which extracts a direct-current component from an output image signal of an amplifier 4, and an adding circuit 5 as shown in FIG. 5, and inputs the input image signal including the added direct-current component into the amplifier 4. Thus the invention corrects the sag occurred in the high pass filter on the output side. Consequently, the invention of the Patent Document 2 has a similar problem and an object to those of the present invention and enables the miniaturization of the capacitor to the same degree as that of the present invention, but the object resetting method of the invention of the Patent Document 2 is greatly from that of the present invention.

SUMMARY OF THE INVENTION

It is a main object of the present invention to provide an image signal amplifying circuit enabling the miniaturization and cost reduction of the output capacitor while preventing the occurrence of any sag.

It is another object of the present invention to provide an amplifying semiconductor integrated circuit including a small number of external terminals and a small number of external elements when a part of the image signal amplifying circuit is made of a semiconductor integrated circuit.

To achieve at least one of the objects, in accordance with a first aspect of the present invention, an image signal amplifying circuit comprises:

an amplifier circuit for amplifying an image signal;

an output capacitor and a resistance, both being serially connected between an output node of the amplifier circuit and an output terminal; and a second-order high pass filter having a value of Q larger than one, the second-order high pass filter being provided at a preceding stage of the amplifier circuit, wherein distortion to correct sag arising in a high pass filter on an output side, the high pass filter including the output capacitor and the resistance, is caused in the input image signal by a characteristic of the second-order high pass filter.

In accordance with an other aspect of the present invention, an amplifying semiconductor integrated circuit comprises:

an amplifier circuit for amplifying an image signal;

an output capacitor and a resistance, both being serially connected between an output node of the amplifier circuit and an output terminal; and a second-order high pass filter including an operational amplifier circuit coupled so that an output voltage thereof may be fed back to a negative phase input terminal thereof, a first input capacitor and a second input capacitor, both being serially connected between an input terminal and a positive phase input terminal of the operational amplifier circuit, a feed back resistance connected between a connection node of the first input capacitor and the second input capacitor and an output node of the operational amplifier circuit, and a bias resistance connected between the positive phase input terminal of the operational amplifier circuit and a constant potential point, wherein a value of Q of the second-order high pass filter provided at a preceding stage of the amplifier circuit is larger than one, wherein the amplifying semiconductor integrated circuit is used for constituting an image signal amplifying circuit for causing distortion in the input image signal, the distortion to correct a sag arising in a high pass filter on an output side including the output capacitor and the resistance by a characteristic of the second-order high pass filter, wherein the amplifier circuit, the operational amplifier circuit, the feed back resistance, and the bias resistance are formed as a semiconductor chip, the semiconductor chip being provided with a first external terminal, to which the positive phase input terminal of the operational amplifier circuit is internally connected and the first input capacitor is externally connected, a second external terminal, to which the first and second input capacitors are externally connected, a third external terminal, to which the output node of the amplifier circuit is internally connected and the output capacitor is externally connected, a fourth external terminal, to which a power source voltage is applied, and a fifth external terminal to which ground potential is applied.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein.

DETAILED DESCRIPTION OF THE PREFERRED EMBODIMENTS

In the following, a preferable embodiment of the present invention will be described with reference to the attached drawings.

Figure 1:
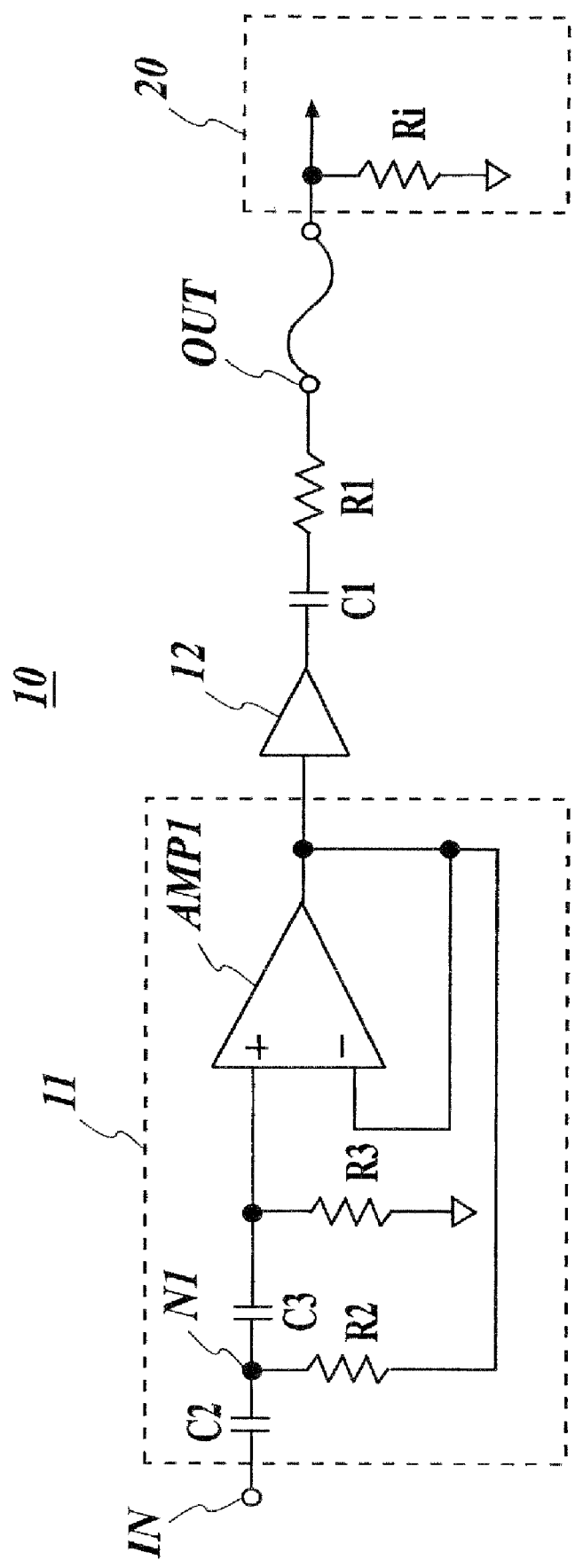
FIG. 1 is a circuit diagram showing an embodiment of an image signal amplifying circuit according to the present invention.

FIG. 1 shows an embodiment of an image signal amplifying circuit according to the present invention.

The image signal amplifying circuit 10 of the present embodiment includes a second-order high pass filter 11 connected to an input terminal IN, to which an image signal is input, an output buffer 12 amplifying the outputs of the high pass filter 11, and an output capacitor C1 and an output resistance R1, both being serially connected between the output buffer 12 and an output terminal OUT. A signal output to the output terminal OUT is transmitted to a receiving side circuit 20 through a transmission path, such as a cable. An input resistance Ri is connected between an input terminal of the receiving side circuit 20 and a ground point. The JEITA prescribes that a resistance 75Ω should be used as each of the output resistance R1 and the input resistance Ri ("Connection Requirements of Electric Signals of AV Equipment" CP-1203, p8).

The high pass filter 11 includes an operational amplifier circuit (Op Amp) AMP1 coupled so that the output voltages thereof may be fed back to the negative phase input terminal (−) thereof, input capacitors C2 and C3, both being serially connected between the input terminal IN and the positive phase input terminal (+) of the operational amplifier circuit AMP1, a feed back resistance R2 connected between the connection node N1 of the input capacitors C2 and C3 and the output terminal of the operational amplifier circuit AMP1, and a resistance R3 connected between the positive phase input terminal (+) of the operational amplifier circuit AMP1 and a constant potential point, such as the ground point. Thus, the high pass filter 11 is configured so that an image signal may be input into the positive phase input terminal (+) of the operational amplifier circuit AMP1 through the input capacitors C2 and C3. The output buffer 12 may be any buffer as long as the buffer can amplify a signal without inverting the polarity of the signal and without distorting the signal in a predetermined amplitude range.

In the circuit of FIG. 1, a first-order high pass filter is formed of the output capacitor C1 and output resistance R1 at the subsequent stage of the output buffer 12 and the input resistance Ri of the receiving side circuit 20. Since each of the output resistance R1 and the input resistance Ri is prescribed to be 75 Ω; the cut-off frequency fc1 of the parasitic high pass filter must be set to about 1 Hz in order to pass the signals of 30 Hz or more without causing any distortion, and the output capacitor C1 must be set to be 1000 μF or more.

The image signal amplifying circuit 10 of the present embodiment is provided with the second-order high pass filter 11 at the preceding stage of the output buffer 12, and sets the cut-off frequency fc2 of the high pass filter 11 to be lower than the cut-off frequency fc1 of the high pass filter on the output side, and further sets the value of Q of the high pass filer 11 to be larger than one. Thereby, the image signal amplifying circuit 10 makes it possible to amplify the signals without any distortion even if a capacitor having a small capacitance value is used as the output capacitor C1.

Figure 2:
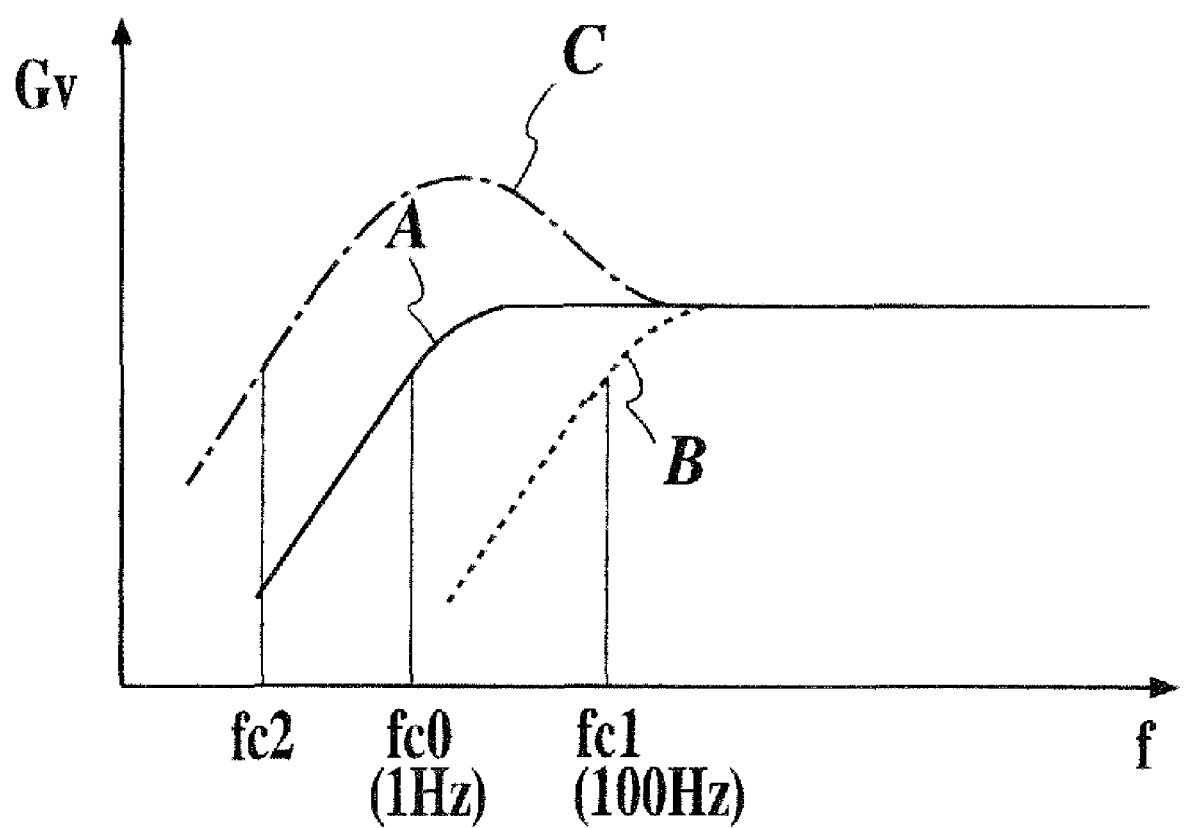
FIG. 2 is a frequency characteristic diagram for illustrating the operation principle of the image signal amplifying circuit of the embodiment.

To put it more concretely, as shown in FIG. 2, if the desirable frequency characteristic of the image signal amplifying circuit 10 is expressed by a solid line A, the frequency characteristic of the high pass filter on the output side shifts to the higher frequency side as shown by a broken line B by using an output capacitor C1 having a small capacitance value. Accordingly, the image signal amplifying circuit 10 of the present embodiment designs the frequency characteristic of the second-order high pass filter 11 at the preceding stage as an alternate long and short dash line C, and previously causes the distortion correcting the distortion to be caused in the high pass filter on the output side in signals to be input into the output buffer 12.

In this case, if the cut-off frequency of the desirable frequency characteristic A of the image signal amplifying circuit 10 is denoted by fc0, then the cut-off frequency fc2 of the high pass filter may be designed so as to satisfy a relationship of fc2<fc0<fc1. If the optimum cut-off frequency fc2 is set to satisfy, for example, fc0=(fc1+fc2)/2, then the design is easy, although the optimum cut-off frequency fc2 differs dependently on the way of setting the value Q. The cut-off frequency fc2 of the second-order high pass filter 11 in FIG. 1 can be determined on the basis of the resistance ratio of the resistances R2 and R3 if the capacitance values of the input capacitors C2 and C3 are set to be one to one.

Next, the concrete value of each of the capacitors C1, C2, and C3 and the resistances R1, R2, and R3 in the image signal amplifying circuit 10 of the present embodiment is examined. Because the input capacitors C2 and C3 hardly influence the frequency characteristic of the image signal amplifying circuit 10, the capacitance values of the capacitors C2 and C3 can be set to small values, such as 0.1 µF. The cut-off frequency fc0 of the desirable frequency characteristic A of the image signal amplifying circuit 10 is 1 Hz. If the capacitance values of the input capacitors C2 and C3 are 0.1 µF, then it is found that the cut-off frequency fc2 of the frequency characteristic of the second-order high pass filter 11 can be made to be sufficiently smaller than the cut-off frequency fc0 by setting the summated resistance value (R2+R3) of the resistances R2 and R3 to be about 200 kΩ on the basis of a trial calculation of the present inventor.

The reason why the summated resistance value (R2+R3) is set to be about 200 kΩ here is that the cut-off frequency fc2 differs dependently on the cut-off frequency fc1 of the high pass filter on the output side, and that the cut-off frequency fc2 depends on the resistance ratio of the resistances R2 and R3. If it is supposed that the cut-off frequency fc1 of the high pass filter on the output side is sufficient at 100 Hz, then since R1+Ri=150Ω, the value of the output capacitor C1 can be set to be about 10 µF, and a chip capacitor can be used as the output capacitor C1 in stead of an electrolytic capacitor. Since the capacitance values of the input capacitors C2 and C3 are severally 0.1 µF, the present embodiment becomes possible to use the chip capacitors as all of the capacitors C1-C3 to be used.

Figure 3:
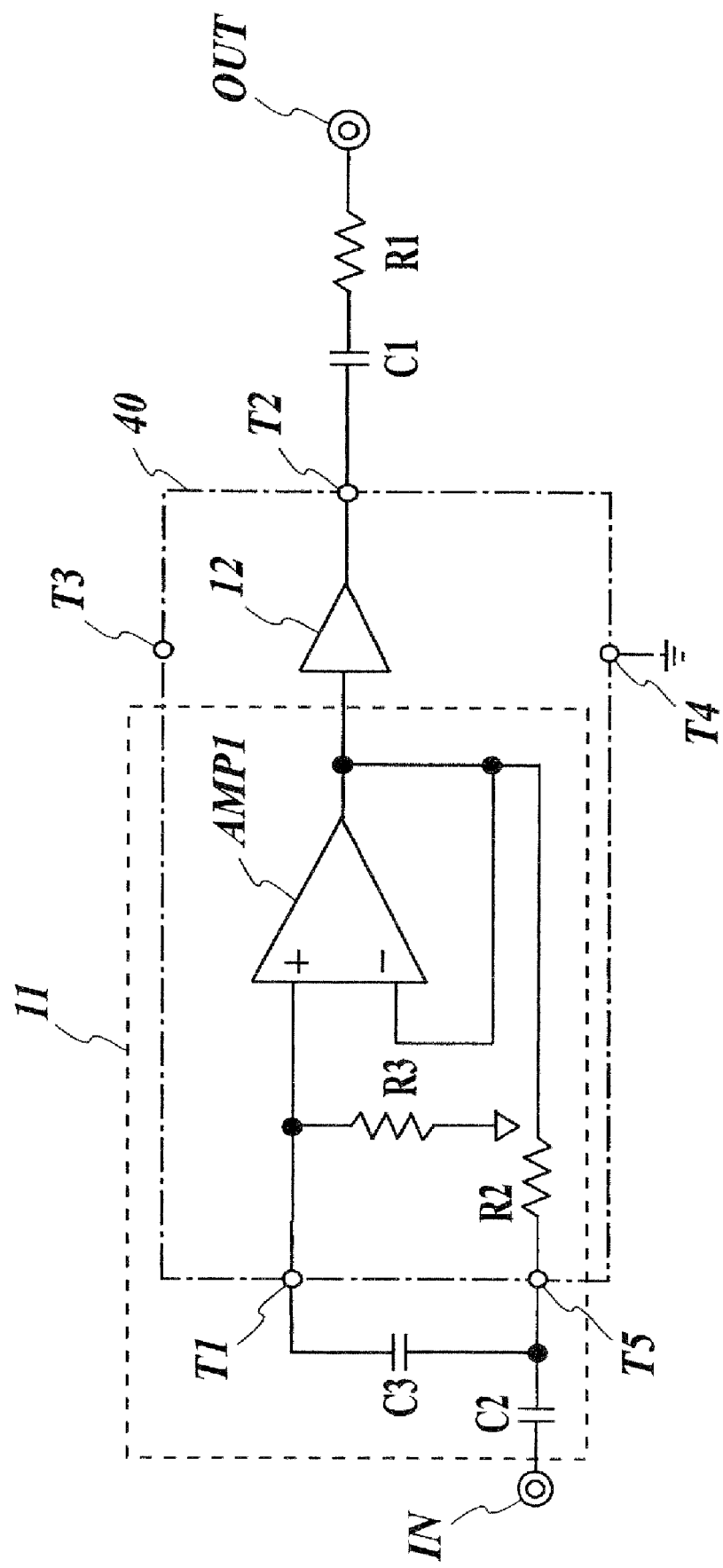
FIG. 3 is a circuit diagram showing a modification of the image signal amplifying circuit of the embodiment.
Figure 4A:
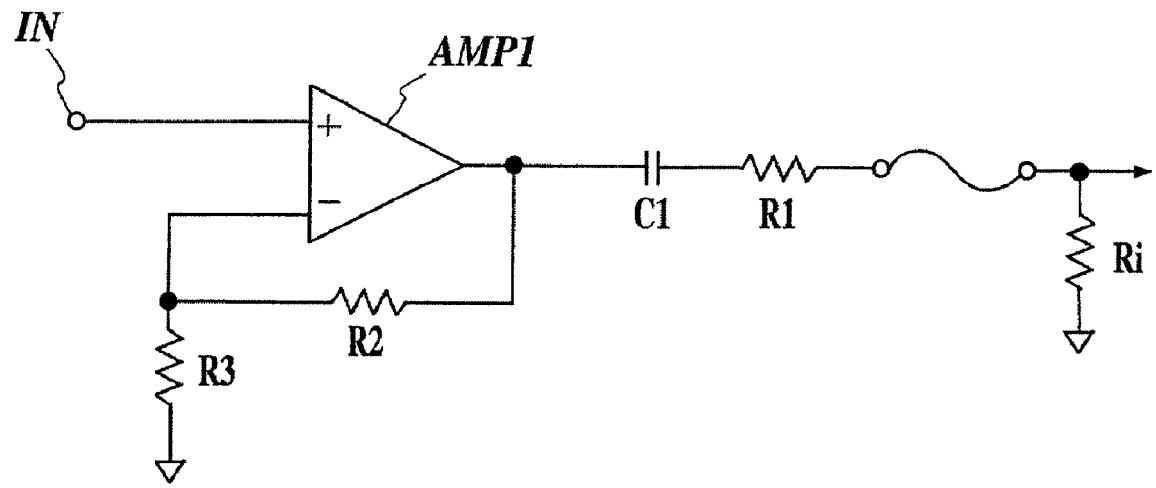
FIGS. 4A and 4B are circuit diagrams showing examples of conventionally proposed image signal amplifying circuits.
Figure 4B:
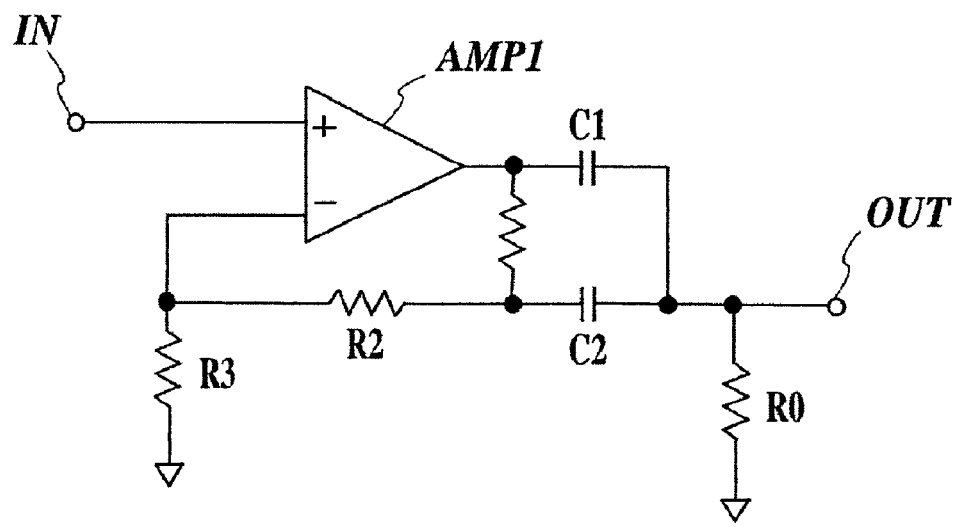

FIG. 3 shows a modification of the image signal amplifying circuit 10 of the present embodiment. The modification is configured so that the part enclosed by an alternate long and short dash line 40 in FIG. 3 is formed as a semiconductor integrated circuit (hereinafter referred to as an amplifying semiconductor integrated circuit in the present specification) on a semiconductor chip, and the other elements are configured by using discrete external elements.

To put it concretely, the Op Amp AMP1 and the resistances R2 and R3, which constitute the second-order high pass filter 11, and the elements constituting the output buffer 12 are formed on a semiconductor chip, such as a single crystal silicon substrate, and the capacitors C1, C2, and C3 and the resistance R1, each of which is made of a discrete part, are connected to the external terminals of the semiconductor chip. T1 denotes an input terminal; T2 denotes an output terminal; T3 denotes a power source voltage terminal; T4 denotes a ground terminal, and T5 denotes a terminal for connecting the capacitors C2 and C3. According to the present modification, the number of the external terminals T1-T5 of the amplifying semiconductor integrated circuit is five.

Next, the differences between the image signal amplifying circuit 10 of the present invention and the image signal amplifying circuit disclosed in the Patent Document 2 are described.

Figure 5:
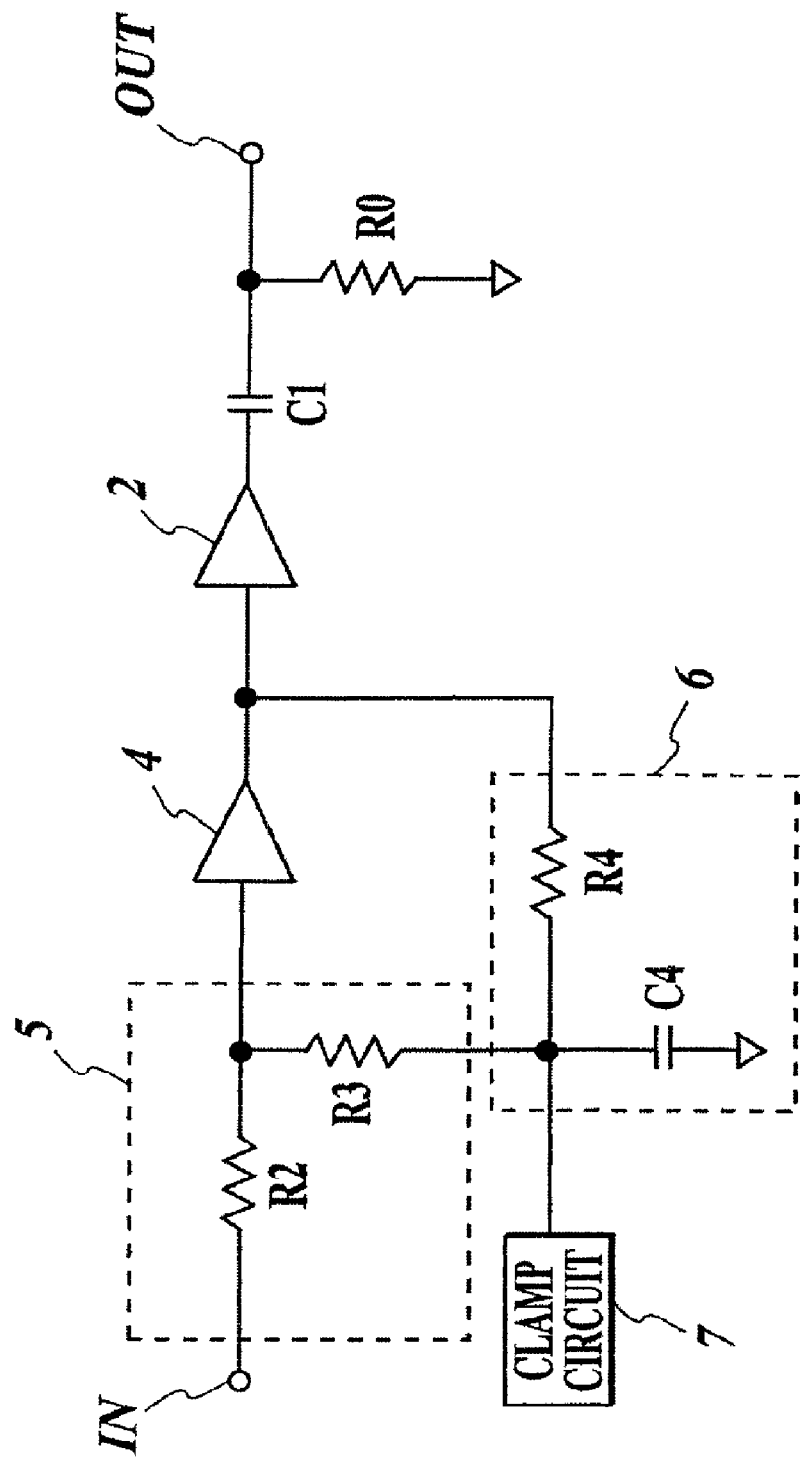
FIG. 5 is a circuit diagram showing an example of a conventionally proposed image signal amplifying circuit in the Patent Document 2.

The invention of the Patent Document 2 aims at the miniaturization of a capacitor while preventing the occurrence of any sag, and the problem and object of the invention are similar to those of the present invention. However, the invention of the Patent Document 2 is provided with the low pass filter 6 extracting the direct-current component of an output image signal of the amplifier 4 and the adding circuit 5 as shown in FIG. 5, and inputs the input image signal including the added direct-current component into the amplifier 4. The invention thus corrects the sags arising in the high pass filter on the output side.

On the other hand, the present invention is provided with the second-order high pass filter 11 on the input side, and previously causes distortion in an input image signal by the characteristic of the second-order high pass filter 11 to correct the sags arising in the high pass filter on the output side by the distortion. The present invention thus enables the miniaturization of the capacitor C1 while preventing the occurrence of the sags. That is, it can be said that the invention of the Patent Document 2 corrects the distortion of the outputs thereof by a feed back system, while the present invention corrects the distortion of the outputs thereof by a feed forward system. Consequently, the solving methods of the problem of the invention of the Patent Document 2 and the present invention are greatly different from each other Incidentally, if the configurations of FIG. 5 and FIG. 1 are compared with each other, the circuit of FIG. 5 looks as if the circuit includes fewer capacitors to be advantageous, but the invention of the Patent Document 2 also needs a coupling capacity C2 as shown in FIG. 6 in an actual circuit, and the numbers of the capacitors of both of the present invention and the invention of the Patent Document 2 are the same.

Moreover, the invention of the Patent Document 2 can use a chip capacitor having a small capacitance value of about 10 µF as the output capacitor C1 similarly to the present invention, but if the invention is considered to be configured by the use of a semiconductor chip, then the configuration thereof greatly differs from that of the present invention.

In the circuit, shown in FIG. 5, of the embodiment of the invention of the Patent Document 2, if the capacitance value of the capacitor C4 constituting the low pass filter 6 is set to 0.1 µF, which is the same as those of the capacitors C2 and C3 of the present invention, then the resistance value of a resistance R4 is required to be about 10 MΩ. Consequently, an on-chip resistance can be used as the resistance R4, though not quite satisfactorily. However, the on-chip resistance has disadvantages that the temperature characteristic thereof is lower than that of an external resistance, and that the dispersion of resistance values is large owing to the dispersion of manufacture if the on-chip resistance is used as the resistance R4.

Figure 6:
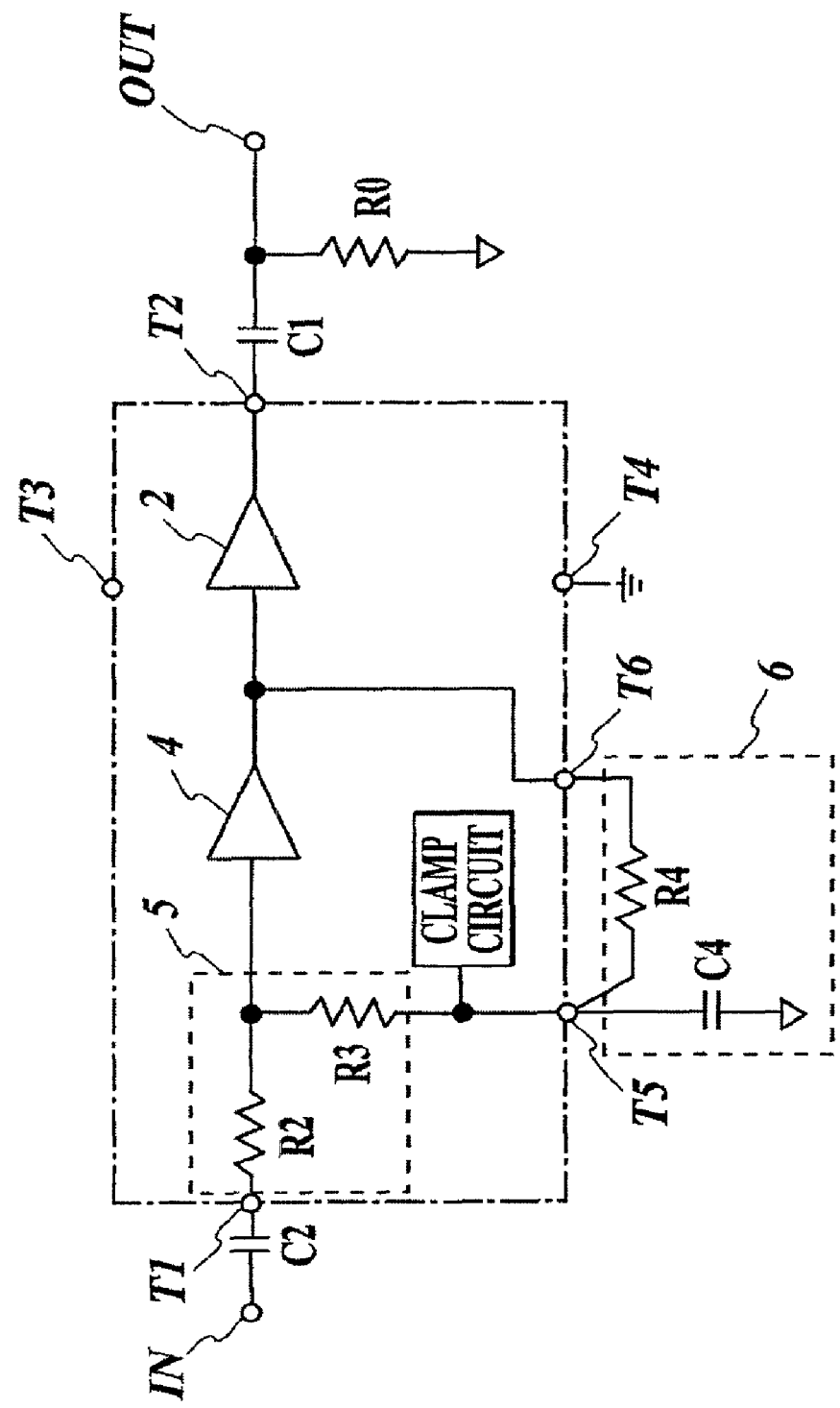
FIG. 6 is a circuit diagram showing the configuration of a circuit supposed when a part of the circuit shown in FIG. 5 is made of a semiconductor integrated circuit.

Consequently, if the circuit of the embodiment of the invention of the Patent Document 2 is made of a semiconductor integrated circuit, then it is considered to be general that the amplifier 4, the resistances R2 and R3, the output buffer 2, and the elements constituting a clamp circuit are formed on a semiconductor chip as shown by an alternate long and short dash line in FIG. 6. In that case, external terminals T5 and T6 for connecting the capacitor C4 and resistance R4 of the low pass filter 6 are separately needed, and consequently the number of the external terminals T1-T6 of the amplifying semiconductor integrated circuit becomes six in all and the external elements increase when the invention of the Patent Document 2 is applied. Consequently, the number of terminals of the amplifying semiconductor integrated circuit increases in comparison with that (see FIG. 3) of the present invention, and then the amplifying semiconductor integrated circuit has disadvantages of being subject to an increase of the cost of the chip and the increase of the number of parts thereof.

Moreover, if an on-chip resistance is daringly used as the resistance R4 in the invention of the Patent Document 2 in order to avoid the increase of the cost of the chip, then the temperature characteristic of the chip lowers, and consequently a disadvantage of the deterioration of the performance of the image signal amplifying circuit in comparison with that of the present invention arises. In particular, in the case of the circuit of the Patent Document 2, the resistance value (several MΩ) of the resistance R4 is larger than those (several hundreds Ω) of the resistances R2 and R3 by nearly two digits, and the manufacturing dispersion of the resistance R4 becomes larger. Consequently, it is conceivable that the use of the external resistance is desirable in order to make it possible to correct the dispersion of the characteristic of the resistance R4.

However, the use of the external element as the resistance R4 increases the number of the external terminals and the external elements as described above. Furthermore, if the resistance value of the resistance R4 is tried to be reduced in the invention of the Patent Document 2 in order to reduce the demerits of the on-chip formation, then it is obliged to enlarge the capacitance value of the capacitor C4 to be larger than 0.1 μF adversely, and an external capacitor larger than that of the present invention becomes necessary. Consequently, it can be said that the image signal amplifying circuit of the present invention is superior to the invention of the Patent Document 2 from the point of view of the formation as a semiconductor integrated circuit.

In the above, the invention made of the present inventor has been concretely described on the basis of the embodiment, but the scope of the present invention is not limited to that of the embodiment. For example, in the aforesaid embodiment, the ground potential is applied to the positive phase side input terminal of the Op Amp AMP1 through the resistance R3, but predetermined constant potential may be applied to the positive phase side input terminal in stead of the ground potential. Moreover, in order not to make the input dynamic range narrower even if the power source voltage is lowered, a clamp circuit for clamping the potential of the positive phase side input terminal of the Op Amp AMP1 may be provided.

The above description has been chiefly given to the case of applying the invention devised by the present inventor to the image signal amplifying circuit, which is a background field of the invention, and the amplifying semiconductor integrated circuit used for the image signal amplifying circuit, but the present invention can be widely used for a circuit for amplifying the other analog signals, such as a sound signal, and an amplifying semiconductor integrated circuit for the circuit. The present invention is particularly effective when it is applied to a circuit amplifying an analog signal having a wide frequency band.

In accordance with a first aspect of the present invention, a second-order high pass filter has a value of Q larger than one at a preceding stage of a non-inverting type amplifier circuit (output buffer) connected to an output capacitor constituting a high pass filter, the output capacitor being connected to the output side of the non-inverting type amplifier, so as to cause distortion in an input image signal in advance by a characteristic of the second-order high pass filter, and the distortion corrects a sag arising in the high pass filter on the output side.

To put it more concretely, the aspect is configured to be provided with an amplifier circuit to amplify an image signal, an output capacitor and a resistance, both being serially connected between an output node of the amplifier circuit and an output terminal, and a second-order high pass filter having a value of Q larger than one, the second-order high pass filter being provided at a preceding stage of the amplifier circuit, wherein distortion to correct a sag arising in a high pass filter on an output side, the high pass filter including the output capacitor and resistance, is caused in the input image signal by a characteristic of the second-order high pass filter.

According to the aspect mentioned above, the distortion to correct the sag arising in the high pass filter on the output side is previously caused in the input image signal by the characteristic of the second-order high pass filter provided in the preceding stage of the non-inverting type amplifier circuit, and consequently it is possible to prevent the occurrence of any sag in an output signal even if the capacitance value of an output capacitor is made to be small.

Moreover, the second-order high pass filter is preferably configured so as to be provided with an operational amplifier circuit coupled so that an output voltage thereof is fed back to the negative phase input terminal thereof; a first input capacitor and a second input capacitor, both being serially connected between an input terminal and a positive phase input terminal of the operational amplifier circuit; a feed back resistance connected between a connection node of the first input capacitor and the second input capacitor and an output terminal of the operational amplifier circuit; and a resistance connected between the positive phase input terminal of the operational amplifier circuit and a constant potential point, wherein the image signal is input into the positive phase input terminal of the operational amplifier circuit through the first and second input capacitors.

In general, an input coupling capacity for direct current (DC) removal and a resistance for setting a bias point of an input terminal are provided at the preceding stage of an amplifier circuit for amplifying an analog alternating current (AC) signal. According to the configuration of the aspect, the input capacitor constituting the second-order high pass filter and the resistance connected between the positive phase input terminal of the operational amplifier circuit and the constant potential point are also used as the input coupling capacity and the bias resistance, respectively, and consequently it becomes possible to provide the second-order high pass filter without increasing elements greatly.

Furthermore, a capacity ratio of the first input capacitor and the second input capacitor is preferably set to one to one. Thereby, the cut-off frequency of the second-order high pass filter becomes possible to be determined by a resistance ratio of the feed back resistance and the resistance connected between the positive phase input terminal and the constant potential point, and consequently the design of the second-order high pass filter becomes easy.

The present invention has an advantage of enabling the provision of an image signal amplifying circuit capable of the miniaturization and cost reduction of the output capacitor while preventing the occurrence of any sag. Moreover, if a part of an image signal amplifying circuit is made of a semiconductor integrated circuit, the present invention has an advantage of enabling the provision of an amplifying semiconductor integrated circuit having a small number of external terminals and a small number of external elements.

The entire disclosure of Japanese Patent Applications No. 2007-289235 filed on Nov. 7, 2007 including specifications, claims, drawings and summaries are incorporated herein by reference in their entirety.

What is claimed is:

1. An image signal amplifying circuit comprising:
an amplifier circuit for amplifying an image signal;
an output capacitor and a resistance, both being serially connected between an output node of the amplifier circuit and an output terminal; and
a second-order high pass filter having a value of Q larger than one, the second-order high pass filter being provided at a preceding stage of the amplifier circuit,
wherein distortion to correct a sag arising in a high pass filter on an output side, the high pass filter including the output capacitor and the resistance, is caused in an input image signal by a characteristic of the second-order high pass filter.

2. The image signal amplifying circuit according to claim 1, wherein the second-order high pass filter includes:
an operational amplifier circuit coupled so that an output voltage thereof may be fed back to a negative phase input terminal thereof;
a first input capacitor and a second input capacitor, both being serially connected between an input terminal and a positive phase input terminal of the operational amplifier circuit;
a feed back resistance connected between a connection node of the first input capacitor and the second input capacitor and an output terminal of the operational amplifier circuit; and
a resistance connected between the positive phase input terminal of the operational amplifier circuit and a constant potential point,
wherein the image signal is input into the positive phase input terminal of the operational amplifier circuit through the first and second input capacitors.

3. The image signal amplifying circuit according to claim 2, wherein a capacity ratio of the first input capacitor and the second input capacitor is set to one to one.

4. An amplifying semiconductor integrated circuit comprising:
an amplifier circuit for amplifying an image signal;
an output capacitor and a resistance, both being serially connected between an output node of the amplifier circuit and an output terminal; and
a second-order high pass filter including an operational amplifier circuit coupled so that an output voltage thereof may be fed back to a negative phase input terminal thereof, a first input capacitor and a second input capacitor, both being serially connected between an input terminal and a positive phase input terminal of the operational amplifier circuit, a feed back resistance connected between a connection node of the first input capacitor and the second input capacitor and an output node of the operational amplifier circuit, and a bias resistance connected between the positive phase input terminal of the operational amplifier circuit and a constant potential point, wherein a value of Q of the second-order high pass filter, which is provided at a preceding stage of the amplifier circuit, is larger than one,
wherein the amplifying semiconductor integrated circuit is used for constituting an image signal amplifying circuit for causing distortion in an input image signal, the distortion being to correct a sag arising in a high pass filter on an output side including the output capacitor and the resistance, by a characteristic of the second-order high pass filter,
wherein the amplifier circuit, the operational amplifier circuit, the feed back resistance, and the bias resistance are formed on a semiconductor chip, the semiconductor chip being provided with a first external terminal, to which the positive phase input terminal of the operational amplifier circuit is internally connected and the first input capacitor is externally connected, a second external terminal, to which the first and second input capacitors are externally connected, a third external terminal, to which the output node of the amplifier circuit is internally connected and the output capacitor is externally connected, a fourth external terminal, to which a power source voltage is applied, and a fifth external terminal, to which ground potential is applied.

* * * * *